United States Patent [19]

Barzynski et al.

[11] 4,056,453
[45] Nov. 1, 1977

[54] UV-CURING PRINTING INKS

[75] Inventors: Helmut Barzynski, Bad Durkheim; Güenter Heil, Ludwigshafen; Karl Klemm, Stuttgart; Helfrid Sander, Beihingen, all of Germany

[73] Assignee: BASF Aktiengesellschaft, Ludwigshafen, Germany

[21] Appl. No.: 709,802

[22] Filed: July 29, 1976

Related U.S. Application Data

[63] Continuation of Ser. No. 527,269, Nov. 26, 1974, abandoned.

[30] Foreign Application Priority Data

Nov. 27, 1973 Germany ............................ 2358948

[51] Int. Cl.$^2$ .......................... C08F 8/00; C08G 18/00
[52] U.S. Cl. .......................... 204/159.23; 204/159.15; 204/159.16; 260/77.5 CR; 260/77.5 AP; 260/836; 260/837 R; 427/54; 428/425; 428/537

[58] Field of Search ............... 260/77.5 CR, 77.5 AP, 260/836, 837 R; 204/159.15, 159.16, 159.19, 159.23

[56] References Cited

U.S. PATENT DOCUMENTS

| | | | |
|---|---|---|---|
| 3,673,140 | 6/1972 | Ackerman et al. | 260/22 TN |
| 3,713,864 | 1/1973 | Ackerman et al. | 117/38 |
| 3,759,809 | 9/1973 | Carlich et al. | 204/159.23 |
| 3,825,479 | 7/1974 | Carlich et al. | 204/159.23 |
| 3,847,770 | 11/1974 | Radlowe et al. | 204/159.23 |

Primary Examiner—Richard B. Turer
Attorney, Agent, or Firm—Keil, Thompson & Shurtleff

[57] ABSTRACT

Printing inks which cure under the action of UV radiation. The inks consist of
A. pigment
B. a mixture of benzophenone and Michler's ketone as the photoinitiator
C. A urethane-acrylate
D. an epoxy-acrylate and/or
E. a N-methylol-acrylamide-ether or N-methylol-methacrylamide-ether.

9 Claims, No Drawings

UV-CURING PRINTING INKS

This is a continuation, of application Ser. No. 527,269 filed Nov. 26, 1974, now abandoned.

The printing inks can be used for the letterpress or offset printing of paper, metal and plastic films.

This application discloses and claims subject matter described in German patent application No. P 23 58 948.2, filed Nov. 27, 1973, which is incorporated herein by reference.

This invention relates to printing inks which cure under the action of UV radiation.

UV-curing printing inks have been known for some time from the patent literature. However, it is only recently that UV-printing inks which from some aspects are adequate for industrial use have been developed. Even so, all previously disclosed UV-printing ink systems still suffer from a number of shortcomings, some of them serious, so that they have not hitherto found market acceptance.

UV-printing inks possess some potential advantages over conventional printing inks; they can be formulated entirely without solvents; when used, for example, for roller printing, they produce substantially less pollution of the environment than conventional heat-set printing inks in which, in some cases, substantial amounts of uncombusted or partially combusted mineral oils are emitted into the atmosphere; in sheet printing, especially in producing high quality multi-color prints, or in printing on printing stocks of little or no absorbency such as specially coated papers, metal foils or plastic films, the production rate is frequently so low, because of the low rate of drying of oxidatively drying systems, that up to 10 hours or more elapse between printing and further processing, such as cutting, folding and the like, and as a result the productivity is low, the capacity of the costly printing machines cannot be utilized and substantial storage costs are incurred. In contrast, using UV-curing printing inks, the printed sheet can be dried immediately, regardless of the printing stock, after leaving the printing machine, without setting-off taking place in stacks or dusting being necessary.

In addition, UV-printing inks have some technical advantages, with regard to the quality of the prints, over conventional printing inks. For example, greater abrasion resistance of the finished prints is achievable. As a result of the ability to dry, or surface-dry, the ink after each individual application in multi-color printing, the "doubling" phenomenon responsible for lowering the print quality is entirely avoided. The difficult and frequently lengthy selection of color sequence, with gradation of viscosities and tack, required for wet-on-wet printing, especially in letterpress printing, is substantially simplified by drying each individual color before applying the next, and does not pose any problems.

In order that all these potential advantages of UV-printing inks over conventional printing inks should genuinely be realized, a UV-printing ink must meet the following four principal requirements:

1. Rate of curing:

It is necessary to have an extremely high curing activity under UV light whilst using as small a number as possible of high output UV lamps, for example a mercury high pressure lamp with a specific output of 80 watt per cm of arc length per color. The economics of the process are very dependent on the investment costs of the UV-drying installation and its power costs and maintenance costs when used for drying. In the case of offset roller printing, the investment costs entailed in a UV-drying installation are substantially less than for conventional heat-set thermal drying installations. However, the running costs can be substantially higher for UV curing if, because of the insufficient curing activity of the UV ink, the power of the requisite installation is excessive. In the case of paper sheet printing, there are additional investment costs and operating costs. These costs must be set against the saving resulting from higher productivity when printing with UV inks.

2. Printability:

The technical properties of the UV-printing inks with regard to viscosity, tack, the behavior of both these factors when varying the temperature and printing speed, and especially the printability at very high printing speeds as well as — in the case of offset printing — the water resistance, must match the state of the art of conventional printing inks. To achieve very rapid UV curing, it is necessary for UV-printing inks to have a totally different composition from conventional printing inks. In order to meet the requirements described above with printing ink binders of completely different composition, that is to say in order to be able to print UV-printing inks which are equally convenient at high printing speeds as are good conventional printing inks, it does not suffice to compose a binder simply from rapidly polymerizing substances frequently referred to in the patent literature as "crosslinking monomers" or "photopolymerizable monomers". The individual components of the binder for UV-printing ink must be selected, and combined, most carefully not only with regard to high rate of curing but also very particularly with regard to optimum printability.

3. Toxicity, skin irritation, and corrosive action on materials used in printing machines and printing plates:

To permit very rapid UV curing, the photopolymerizable compounds have to be synthesized from components, some of which are more or less toxic, have an irritant action on the skin and mucuous membranes and can have a dissolving or swelling actirn on the coatings of the printing machine rollers and on coatings of printing plates. The chemical structure and physical properties of the components used in making up the binder must therefore be such that the adverse effects of the rapidly polymerizing parts of the compound are kept as low as possible, or are eliminated.

4. Shelf life:

The printing inks should have as high a shelf life as possible, i.e. at least 3 to 6 months. The shelf life in the dark depends essentially on the stability of the monomers used and on the thermal stability of the photoinitiator used.

The stability of the monomers can be regulated relatively simply by adding conventional polymerization inhibitors, provided the monomers are not excessively sensitive. However, a large number of the particularly active photoinitiators generally known to those skilled in the art give free radicals, which initiate polymerization, even in the dark, and these radicals cannot be trapped even by substantial amounts of inhibitors without interfering with the photopolymerization. The photoinitiator to be used must therefore also be selected carefully from the point of view of shelf life, particularly if it is to give very rapid drying.

It is known from East German Pat. No. 54,705 that the curing of printing inks by UV radiation can be achieved by adding small amounts of a sulfur-containing photoinitiator to a binder of conventional formulation, i.e. one based exclusively on wood oils. However, it is a disadvantage of this process that the photocrosslinking of the double bonds of the unsaturated resin acid derivatives and oleic acid derivatives takes place too slowly. The drying times thus achievable, which are at least approx. 0.5 – 1 second under the conditions described, are insufficient to compete economically with the drying times of conventional heat-set or quick-set printing inks. Furthermore, the printing inks are insufficiently stable on the printing press, that is to say they start to dry in the printing machine due to curing by air, and this is very undesirable, particularly if the machine is stopped. Furthermore, these inks have an unpleasant smell.

These disadvantages also apply to some of the binders of similar formulations described in German Published Application No. 1,794,230.

German Published application No 1,694,930 and U.s. Pat. No. 3,551,246 describe printing inks, some of which are free from fatty oils and mineral oils. These printing inks use polyfunctional acrylates of simple polyols, such as, for example, trimethylolpropane triacrylate, in addition to resins and photoinitiators. The disadvantage is the high toxicity and skin-irritant action of the acrylates employed, especially the toxicity on inhaling the vapors or aerosols, and the use of chlorinated biphenyls and triphenyls, which is a hazard particularly because of the heptatotoxic effect of these compounds. A further disadvantage is that the rate of curing is still to low, the minimum exposure times being in excess of 1 second. Those of the printing inks in the abovementioned patents which do not contain any chlorinated aromatic compounds are admittedly less toxic, but still have a powerful skin-irritant action. Furthermore, their shelf life is at best between a few days and 2 weeks. when the inks are printed, there is a more or less pronounced increase in the tack at high printing speeds, substantially greater than the increase with conventional inks, and this greatly limits the production rate.

German published application No. 2,200,478 describes printing inks in which fatty oils and acrylic ester groups are present simultaneously in the photopolymerizable molecules. Whilst these printing inks have good printability and low toxicity, the minimum exposure times achievable are far from adequate from an economic point of view.

In the above examples of inks which have a substantially improved dryig rate, no oil, or substantially less oil, is used and instead polyfunctional acrylic acid esters of simple polyols such as trimethylolpropane triacrylate or pentaerythritol tetraacrylate are used as reactive diluents. Here again, the high toxicity and above all the powerful skin-irritant action of the acrylic acid esters mentioned is a disadvantage. A further disadvantage is the marked deterioration in the printability — which is no longer adequate — compared to oily compositions.

German published applications No. 2,157,115 and 2,158,529 also mention combinations of fatty oils with methacrylic acid esters or acrylic acid esters as photopolymerizable constituents. Whilst the addition of the high proportions of fatty oils., mineral oils and other printing auxiliaries required for printability results in good printability coupled with low toxicity, the exposure times of 1 to 2 seconds which these printing inks require are too long by a factor of 5 to 10, for their economical use.

The examples of UV-curing printing inks mentioned in the published patent literature and discussed here show that it has not hitherto proved possible to develop a UV-printing ink which has the requisite properties and is at the same time economical, and which simultaneously fulfils, to a high degree, all four principal requirements listed. For this reason, no UV-printing inks have hitherto been able to find market acceptance and such inks are only used to a limited degree in a few special applications.

It is an object of the present invention to provide a photopolymerizable binder which cures extremely rapidly under the influence of ultraviolet light and has good compatability with conventional pigments, and to provide printing inks, for letterpress and offset printing, produced from this binder, which essentially uses little or none of the fatty oils and hard resins of conventional binders and requires an exposure time of less than 0.2 second, in coating thicknesses of 0.8 to 1.5 $\mu$, when irradiated with Hg high pressure lamps.

It is a further object of the invention to provide photopolymerizable systems, and printing inks produced therefrom, which make it possible to combine very good printability with high printing speeds.

It is a further object of the invention to achieve the requisite short exposure times inter alia 1. by means of a special synergistic combination of monomers and photoinitiators, which are substantially less sensitive to inhibition by atmospheric oxygen during photopolymerization, and 2. through the fact that little or no plasticizing compounds containing oil, or fatty oils, or mineral oils, are used in the printing ink.

It is a further object of the invention so to select the individual photopolymerizable compounds that each individual substance has as low a toxicity as possible, has no irritant action or at most a slight action — after long exposure in the case of particularly sensitive personnel and in the event of inadequate or no protective measures — on the skin and mucous membranes, on direct contact, but especially on exposure to the vapors and aerosols and also does not penetrate the skin or contact and produce toxic effects. Very particularly, the compounds should be so chosen that there is no inhalation toxicity hazard.

It is a further object of the invention to provide printing ink components and printing inks which do not objectionably attack or swell the coverings of rollers in the printing machine, or printing plate materials.

The present invention relates to printing inks which cure under the influence of UV radiation and which essentially consist of A. from 0 to 50 percent by weight of a pigment conventionally used in printing inks, B. from 0.5 to 15 percent by weight of a mixture of benzophenone and Michler's ketone, C. from 25 to 90 percent by weight of at least one olefinically unsaturated compond which per molecule contains at least one acrylic or methacrylic group of the formula

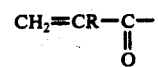

(with R = H or CH$_3$) and at least one urethane group, and has a molecular weight of from 250 to 4,000 it being preferred to use a mixture of a relatively high molecular weight component CI of molecular weight from 800 to 4,000, preferably from 1,000 to 2,000, and a relatively low molecular weight component CII of molecular weight fro 250 to 800, preferably from 350 to 600, and D. from 5 to 35 percent by weight of at least one reaction product of a. a diglycidyl ether of an aliphatic diol, triol or tetrol of 2 to 8 carbon atoms with b. at least one mole of acrylic acid or methacrylic acid per epoxide group which is optionally esterified or etherified at the free hydroxyl groups and is liquid at 50° C, and/or E. from 5 to 35 percent by weight of at least one compound which contains at least one, and preferably 2 or 3, groupings, per molecule, of the formula

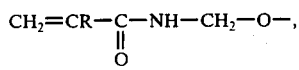

(wherein R is hydrogen or methyl) bonded to a branched alkyl radical or cycloalkyl radical of up to 12 carbon atoms, and is liquid at 50° C, wherein the components C, D and E have a vapor pressure of less than 1 mm Hg at 100° C and have a viscosity greater than 1 poise, and preferably from 2 to 10,000 poise (at 30° C), with the proviso that the sum of the percentages stated under (A) to (E) is 100, and that the printing inks are substantially free from fatty oils based on fatty acids of more than 6 carbon atoms.

The printing inks according to the invention meet the requirements stated earlier to a high degree.

Preferred UV-printing inks according to the invention are those which contain 0, or from 10 to 20, percent by weight of component (A), from 2 to 10 percent by weight of component (B), from 10 to 40 percent by weight of component (CI), from 30 to 60 percent by weight of component (CII), from 10 to 25 percent by weight of component (D) and/or from 10 to 25 percent by weight of component (E), with the proviso that the sum of the percentages stated under (A)–(E) is 100.

UV-curing printing inks which prove particularly advantageous are those wherein component (D) consists of reaction products of diglycidyl ethers of branched aliphatic or cycloaliphatic diols with at least 1 mole of acrylic acid per epoxide group.

Equally, components (E) which have proved particularly advantageous in the UV-curing printing inks according to the invention are the bis-N-methylolacrylamide-ethers of neopentylglycol or hydroxypivalic acid neopentyl-glycol monoester.

We have found, surprisingly, that the urethane-acrylates described in more detail below under component (C), which have been manufactured from aliphatic or cycloaliphatic diisocyanates or polyisocyanates and hydroxyl-containing acrylic acid esters or N-methylolacrylamide-ethers, when used as principal components of the printing inks give very good printability at conventional high printing speeds, without requiring oily constituents, and also meet all the other requirements, mentioned above, in the system according to the invention.

It is known that the free-radical polymerization, and especially the photoplymerization of acrylic compounds can be very greatly retarded, or even completely prevented, by atmospheric oxygen. In layers of printing ink which are only approx. 0.8 to 1.5 μ thick (for example in the thicknesses applied per color when printing paper) this influence of atmosperic oxygen is particularly objectionable. We have now found, surprisingly, that the retarding action of atmospheric oxygen on the rate of polymerization of acrylic double bonds is particularly low if the photoinitiator used is a mixture of Michler's ketone and benzophenone and at the same time the acrylic compounds are present in the form of urethane-acrylic compounds (C). The particularly low sensitivity to oxygen of the combination according to the invention, as compared to other monomer/initiator combinations, is shown in a comparative example.

Some details on the components present in the UV-curing printing inks accordingto the invention are given below:

A. As the pigments, it is possible to use all pigments which are conventionally used in the manufacture of printing inks and are described, for example, in the Color Index, provided they are not incompatible in the binder. All pigments which have a low absorption in the near UV spectrum are particularly suitable.

B. The photoninitators used according to the invention are mixtures of benzophenone and Michler's ketone. The mixtures used have a weight ratio of 1:10 to 10:1, preferably of 1:1. The activity of this initiator combination in general depends very greatly on the nature of the binder components since these participate in the formation of the free radicals which initiate the polymerization. The use of unsaturated polyesters or alkyd resins or numerous aromatic compounds can greatly retard, or completely inhibit, the photopolymerization. In the printing ink mixtures according to the invention, the above initiator combination proves to be particularly active (see comparative Example I). Furthermore, in combination with the main components, provided by the invention, of the binder, the sensitivity of the curing reaction to oxygen is particularly low. From 0.5 to 15, preferably from 2 to 10, percent by weight of the component (B) are employed in the printing ink system according to the invention.

C. Examples of components (C) of average molecular weight from 250 to 4,000, preferably from 350 to 2,000, and having at least one, and preferably from 2 to 6, polymerizable olefinically unsaturated double bonds of the acrylic or methacrylic type

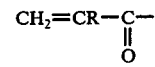

and at least one, preferably from 2 to 6, urethane groupings are:

Polyfunctional isocyanates, containing biuret and/or urea groups, which have been prepared from (a) bifunctional or trifunctional primary or primary/secondary amines and (b) bifunctional isocyanates and have been reacted with (c) equivalent amounts of hydroxyl-containing acrylic acid esters or methacrylic acid esters of N-methylolacrylamide-ethers to give "urethaneacrylic compounds", or difunctional, trifunctional or tetrafunctional isocyanates, containing urethane groups, which have been prepared from (a') diols, triols or tetrols and (b) bifunctional isocyanates and have been reacted with (c) equivalent amounts of hydroxyl-containing acrylic acid ester or methacrylic acid ester or N-methylolacrylamide-ethers to give "urethane-acrylic compounds".

Suitable amines (a) are straight-chain and branched aliphatic or cycloaliphatic diamines of the general formula $H_2N-R-NH_2$, wherein R is an aliphatic or cycloliphatic hydrocarbon radical of 1 to 20 carbon atoms, which can optionally contain a CO or NH or NH₂ grouping, such as, for example, ethylenediamine, 1,2-propylenediamine, 1,3-diaminopropane, dipropylenetriamine, hexamethylenediamine, 2-aminomethylcyclopentylamine, 4,4'-diaminocyclohexylmethane, 3,3'-dimethyl,4,4'-diamindicyclohexylmethane and 2,2,-bis-(4-aminocyclohexyl)-propane.

Suitable diols, trils or tetrols (a') are simple polyfunctional alcohols such as diols of 2 to 8 carbon atoms, for example ethylene glycol, propanediols, butanediols, pentanediols, hexanediols, triols, such as, for example, glycerol, trimethylolpropane and hexanetriols, pentaerythritol and the like, or the polyether-polyols prepared therefrom and obtained by reaction of 1 molecule of alcohol with from 1 to 10 molecules of ethylene oxide or propylene oxide.

Suitable bifunctional iscyanates (b) are aliphatic and cycloaliphatic isocyanates of the general formula OCN-R-NCO. , wherein R is a hydrocarbon radica of 4 to 15 carbon atoms. Examples of such diisocyanates are: hexamethylenediisocyanate, isophoronediisocyanate, bis-(4-isocyanato-cyclohexyl)-methane, bis-(3-methyl-4-isocyanato-cyclohexyl)-methane, 2,2-bis(4-isocyanato-cyclohexyl)-propane, 2,2,4-trimethylhexamethylene1,6-diisocyanate or 2,4,4-trimethylhexamethylene-1,6-diisocyanate.

Suitable hydroxy-containing acrylic or methacrylic compounds (c) are partial esters of polyhydric alcohols with acrylic acid or methacrylic acid, such as, for example, ethylene glycol monoacrylate or monomethylacrylate, 1,2- or 1,3-propanediol monoacrylate or monomethylacrylate, 1,4-butanediol monoacrylate or monomethyacrylate, 1,6-hexanediol monoacrylate or monomethacrylate, trimethylolpropane diacrylate, glycerol diacrylate, pentaertythritol triacrylate and the mono(N-methylolacrylamide)-ethers and mono-(N-methylolmethacrylamide)-ethers of ethylene glycol, propylene glycol, butanediol, hexanediol and neopentyl glycol.

Particularly preferred compounds CI are the reaction products of biuret-isocyantes which have been prepared from hexamethylenediisocyanate, with hydroxypropyl acrylate, as well as urethane-isocyanates which habe been synthesized from 1 mole of trimethylolpropane, or of a polyether-polyol prepared from 1 mole of trimethylolpropane + 3-5 moles of propylene oxide, with 3 moles of hexamethylenediisocyanate and 3 moles of hydroxypropyl acrylate.

Further particularly preferred compounds CI are the reaction products of the abovementioned cycloaliphatic dissocyanates with trimethylolpropane diacrylate or pentaerythritol triacrylate.

The compounds CI are of relatively high viscosity, which is preferably in excess of 500 poise.

Particularly preferred compounds CII are the reaction products of hexamethylenediisocyanate or trimethylhexamethylenediisocyanate with ethylene glycol monoacrylate, propanediolmonoacrylate, butanediol monoacrylate, trimethylolpropane diacrylate or pentaerythritol triacrylate. Component (C) is employed in amounts of from 25 to 90, and preferably from 40 to 85 per cent by weight in the printing ink according to the invention.

D. Examples of particularly suitable components (D) are compounds of the general formula

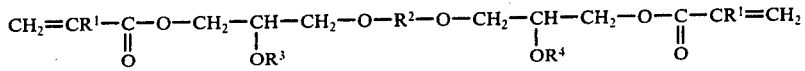

in which R¹ is hydrogen or methyl and R² is a hydrocarbon radical of 2 to 8 carbon atoms, and R³ and R⁴ are identical or different and are hydrogen, alkyl of 1 to 6 carbon atoms or optionally unsaturated acyl of 1 to 6 carbon atoms, and which have been prepared, for example, by reaction of diglycidyl ethers of aliphatic diols, such as, for example, ethylene glycol, propanediol, butanediol, hexanediol, diethylene glycol or triethylene glycol with at least one mole of acrylic acid or methacrylic acid per epoxide group, provided these components (D) have a vapor pressure of less than 1 mm Hg at 100° C. Component (D) is present in the printing ink according to the invention in amounts of from 5 to 35, and preferably from 10 to 25, percent by weight.

E. Preferred components (E) which can be used instead of, or additionally to, component (D) are the bis-N-methylol-acrylamide-ethers of neopentyl glycol, hydroxypivalic acid monoesters of ethylene glycol, propanediol, butanediol, hexanediol and neopentyl glycol, or of divalent alkyl-substituted cycloaliphatic diols, such as, for example, cyclohexandiol derivatives or cyclopentanediol derivatives.

The components (CII) to (E) should be compatible with the components (B) and (CI) and are liquid at 50° C, though in general also at room temperature, and have a vapor pressure of less than 1 mm Hg at 100° C. The viscosity of the mixture CII + D or CII + E is preferably from 20 to 80 poise (at 30° C). These components serve as reactive diluents for adjusting the viscosity and tack of the printing ink to suit the particular application. For use in printing inks, the reactive components (CII) to (E) have the advantages, over the conventional reactive diluents for printing inks, such as ethylene glycol diacrylate, diethylene glycol diacrylate or triethylene glycol diacrylate, butanediol diacrylate, trimethylolpropane triacrylate, hydroxyethyl acrylate, hydroxypropyl acrylate, hydroxybutyl acrylate, benzyl acrylate and other acrylic acid esters of simple structure, that there is no objectionable odor and no inhalation toxicity hazard and that there is hardly and adverse effect on the working life of the rubber coverings of printing rollers. Their toxicity and skin-irritant action, and those of the printing inks produced from these components together with (A) to (CI), is substantially less than those of printing inks which contain the above-mentioned acrylates.

As compared to the reactive diluents based on reaction products of pentaerythritol with acrylic acid, which have also been disclosed for printing inks, the reactive diluents (CII), (D) and (E) have a substantially lower toxicity and lower irritant action on the skin.

In producing the components (C), (D) and (E) by conventional processes of reacting isocyanates or epoxides with alcohols or etherifying N-methylolacrylamide with primary alcohols, not only pure compounds are produced but also mixtures of compounds, comprising isomers and, in the case of polyfunctional compounds, partially reacted and completely reacted products. These by-products may have an adverse effect on the properties of the total composition, though they do not necessarily have such an effect. Hence, the figures, in moles, which have been quoted, only related to the idealized structures of the substances used in the mixtures according to the invention. In some cases it is necessary, for example when producing the isocyanates of component (C) or when producing component (E), to employ more than the amount of diisocyanate or N-methylolacrylamide which is to be reacted. If the uncovered compounds interfere, they are removed, after completion of the reaction, by distillation or deodorization in vacuo, or by washing out or other conventional purification processes. This is also done with substances which have an objectionable odor and/or are toxic, for example acrylic acid and low-boiling acrylic acid esters, catalysts which interfere, and the like. After the reaction of the polyisocyanates with hydroxyalkylacrylic compounds, there should be no free isocyanate groups and also, if possible, no free hydroxyalkyl acrylates, left in the products. Small residual amounts of isocyanate are converted by addition of from 1 to 3% of alcohols such as, for example, methanol or ethanol.

In order to modify the printability or properties of the cured prints produced, it is possible to add, to the printing inks according to the invention, small aounts — provided these are compatible — of hard resins or copolymerizing soft resins, other oil-free monomers and limited quantities of conventional printing auxiliaries. However, care must be taken to ensure that there is no adverse effect on the properties of the printing inks according to the invention. The printing inks should be substantially free from fatty oils, that is to say they must not contain more than 5% by weight, and preferably not more than 2% by weight, of fatty oils.

The parts and percentages mentioned in the Examples and Comparative Examples are by weight, unless stated otherwise.

COMPARATIVE EXAMPLE I

Various monomers were each mixed with 4 per cent by weight of photoinitiator or mixtures of photoinitiators, whilst stirring and heating to 60° C. 6$\mu$ thick films of the mixtures were applied to art printing paper by means of a doctor blade. Half of the liquid film was covered with a thin, transparent, air-impermeable plastic film which showed little or no adhesion to the monomers used or to the polymers after exposure to light. Accordingly, with the exception of the atmospheric oxygen already dissolved in the mixture, the film no longer came into contact with atmospheric oxygen, in the covered areas, during subsequent exposure to light. The liquid film was exposed to a flat-plate unit "Ideal" as supplied by Moll, Solingen, fitted with twenty 40 watt low pressure fluorescent tubes. The exposure time after which the film was completely tack-free was determined. In many cases, the time required to reach complete freedom from tack was preceded by a longer period during which the film no longer set off (on contact with a counter-paper) and showed only little adhesion. The state of this period is quoted as the lower limit in each case. The following monomers were used:

I. Trimethylopropane triacrylate (abbreviated as TMPTA) as an example of a simple crosslinking acrylic acid ester, II. neopentyl glycol bis-(N-methylolacrylamide)-ether (abbreviated as NA) as an example of the N-methylolacrylamide ethers (E), III. the reaction product of hexamethylenediisocyanate with a 3:1 isomer mixture of 1,2-propanediol-1-monoacrylate and 1,2-propanediol-2-monoacrylate (= hydroxypropyl acrylate) (abbreviated as HMDI/2 HPA) as an example of the "urethaneacrylic compounds" (C).

Because of the low viscosity of trimethylolpropane triacrylate, which would distort the results in the sense that longer exposure times would be required, the trimethylolpropane triacrylate was mixed with a compatible resin, in this instance ® Santolite MHP, manufactured by Monsanto. This also has the advantage that only mixtures of similar double bond concentrations are compared. The photoinitiators were abbreviated as follows:

BPE = benzoin isopropyl ester
BPh = benzophenone
M.K. = Michler's ketone

| No. | Composition parts by weight | | Exposure time (sec) with covering film | Exposure time (sec) without covering film | O$_2$ sensitivity factor |
|---|---|---|---|---|---|
| 1 | 61 TMPTA, 35 Santolite MHP, 4 BPE | | 3 | 1800–1900 | 640 |
| 2 | 61 TMPTA, 35 Santolite MHP, 4 BPh | | 180–300 | 5400 | |
| 3 | 61 TMPTA, 35 Santolite MHP, 4 MK | | 6 | 2400 | 400 |
| 4 | 61 TMPTA, 35 Santolite MHP, 2 PBh + 2 PBE | | 2 | 1800 | 900 |
| 5 | 61 TMPTA, 35 Santolite MHP, 2 BPh + 2 MK | | 1 | 420–600 | 600 |
| 6 | 96 NA | 4 BPE | 2–3 | 600 | 200–300 |
| 7 | 96 NA | 4 BPh | 10–12 | 3600 | |
| 8 | 96 NA | 4 MK | 180 | 3600 | |
| 9 | 96 NA | 2 BPh + 2 BPE | 2 | 1100–1500 | 750 |
| 10 | 96 NA | 2 BPh + 2 MK | 1 | 240–500 | 500 |
| 11 | 96 HMDI/2 HPA | 4 BPE | 2 | 900 | 450 |
| 12 | 96 HMDI/2 HPA | 4 BPh | 5 | 1800–2000 | 400 |
| 13 | 96 HMDI/2 HPA | 4 MK | 3 | 1800 | 600 |
| 14 | 96 HMDI/2 HPA | 2BPh + 2BPE | 2 | 1200–1500 | 750 |
| 15 | 96 HMDI/2 HPA | 2BPh + 2MK | 1 | 10–15 | 15 |
| 16 | 56 TMPTA, 35 Santolite MHP 5 TEA, 4 BPE | | 1 | 420 | 420 |
| 17 | 91 HMDI/2 HPA, 5 TEA | 4 BPE | 2 | 100–1200 | 600 |
| 18 | 91 HMDI/2 HPA, 5 TEA | 2 BPh + 2 BPE | 2 | 900–1200 | 600 |
| 19 | 91 HMDI/2 HPA, 5 TEA | 2 BPh + 2 MK | 1 | 6–8 sec | 8 |
| 20 | 96 EH/3HMDI/4HPA | 2 BPh + | | | |

-continued

| No. | Composition parts by weight | | Exposure time (sec) | | O₂ sensitivity factor |
|---|---|---|---|---|---|
| | | | with covering film | without covering film | |
| 21 | 96 ®Desmodur N/3.3 HPA | 2 MK | 4" | 60" | 15 |
| 22 | 96 Polyether-polyol/ 4 HMDI/5 HPA | 2 BPh + 2 MK | 8" | 30" | 4 |
| 23 | 96 TDI/2 HPA | 2 BPh + 2 MK | 3" | 60–90" | 20–30" |
| 24 | 96 HMDI/2 HPA | 2 BPh + 2 MK | 60–90" | 3600 | 40–60 |
| | | 2 BPh + 2 methane base | 4" | 3600 | 900 |

Abbreviations:
 HMDI : hexamethylenediisocyanate
 TDI : toluenediisocyanate
 HPA : hydroxypropyl acrylate
 TEA : triethanolamine
 Methane base : 4,4'-dimethylaminodiphenolmethane
 EH/3HMDI/4HPA = urethane-acrylate mixture of 1 mole of ethylene urea + 2 moles of HMDI reacted to give the new diisocyanate and excess HMDI. All isocyanate groups reacted completed with a total of 4 moles of HPA.

®Desmodur N / 3.3 HPA synthesized analogously to EH/3HMDI/4HP/Polyether-polyol/4HMDI/5HPA ®Desmodur N = polyfunctional isocyanate manufactured by Bayer AG Polyether-polyol: prepared by reaction of 1 mole of trimethylolpropane with 4.2 mols of propylene oxide.

Comparison of mixtures 11–14 with 1–10 shows that the urethane-acrylates (C) are as oxygen-sensitive as other acrylic compounds. The mixtures 5, 10 and 15 prove the synergistic action — which is in itself known — of the photoinitiator combination of benzophenone + Michler's ketone. Mixtures 5 and 10 furthermore show that these initiator combinations with the simple acrylic acid esters or with the N-methylolacrylamide-ethers show a sensitivity to oxygen which is approximately comparable to that shown by these monomers with other photoinitiation systems.

Accordingly, from the state of the art an exposure time, in the presence of atmospheric oxygen, of approx. from 400 to 600 seconds would be expected for the combination of the urethane-acrylate with Michler's ketone/benzophenone. However, the exposure time is found to be only from 10 to 15 seconds. In contrast, the exposure time in the absence of atmospheric oxygen lies within the expected range. The low effect of atmospheric oxygen on the photopolymerization of this special combination of urethane-acrylic compound (C) and photoinitiator mixture is surprising and has not hitherto been disclosed. This effect can be utilized not only for printing inks but also for the photopolymerization of other thin layers, such as coating materials for negative-offset printing plates and for photoresists.

The synergistic effect with regard to substantially reduced sensitivity to oxygen can be observed to a comparable degree in combination with other components (C), as shown by Comparative Examples 20–22. Analogous results to those with trimethylolpropane triacrylate are also obtained with other simple polyacrylates or with the acrylates described under (D).

As shown by Example 23, urethane-acrylates prepared from aromatic isocyanates are unsuitable for use in major amounts.

U.S. Pat. No. 3,552,986 describes a method of reducing the sensitivity to oxygen by, inter alia, adding regulators, such as amines, to the photopolymerizable mixture. Comparative Examples No. 16 to 19 show that this only leads to substantially less improvement than that achieved with the synergistic monomer/initiator combination according to the invention. Comparative Example 24 shows, additionally to Example 13, that the greatly reduced sensitivity to oxygen is not even partially due to the amine properties of Michler's ketone, but only to the photoinitiator properties of Michler's ketone, since the aromatic amine analogous to Michler's ketone but devoid of a keto group is completely inactive. To achieve a good effect, only the addition of major amounts of amines serves a purpose, but leads to disadvantages in use, because of the physical and/or physiological properties of the amines. The particularly active ethanolamines, such as, for example, triethanolamine, are less suitable for use in offset printing inks, because of their solubility in water.

When irradiating with Hg high pressure lamps and reflectors, the irradiation times at a lamp rating of 80 watt/cm of arc length are reduced by an average factor of from 80 to 120.

COMPARATIVE EXAMPLE II

A series of soft rubber samples, of Shore hardness A of approx. 40–60, and of defined length and defined weight, was stored in various monomers for 3 days at 25° C; the samples were then carefully freed from externally adhering monomer and the percentage change in length Δl and change in weight ΔW were determined:

| Grade of rubber | EGDA | | NA | | BCGL/AS | | HMDI/2HPA + GL/AS 3:1 | |
|---|---|---|---|---|---|---|---|---|
| | Δl % | ΔW % | Δl % | ΔW % | Δl % | ΔW % | Δl % | ΔW % |
| Natural rubber | +3.2 | +2.1 | 0 | −0.7 | 0 | −0.02 | 0 | −0.76 |
| Perbunan, grade A | +10.6 | +27.2 | 0 | +0.9 | 0 | +1.2 | +0.5 | +2.0 |
| Perbunan, grade B | +8.7 | +22.1 | +0.1 | +0.5 | +0.2 | +0.4 | +1.4 | +1.9 |
| Perbunan, grade C | +3.5 | +6.5 | +0.8 | −0.6 | −0.8 | −3.0 | 0 | −0.03 |
| Perbunan, grade D | +0.5 | +4.8 | +1.2 | +0.3 | 0 | −0.9 | 0 | −0.21 |

-continued

|  | EGDA | | NA | | BCGL/AS | | HMDI/2HPA + GL/AS 3:1 | |
|---|---|---|---|---|---|---|---|---|
| Grade of rubber | Δl % | ΔW % | Δl % | ΔW % | Δl % | ΔW % | Δl % | ΔW % |
| Buna | +1.3 | +1.8 | +0.9 | +0.7 | −0.2 | −1.2 | 0 | −0.15 |
| Styrene-butadiene rubber | −0.3 | +3.6 | +0.3 | +0.6 | −0.3 | −0.5 | +0.26 | −0.15 |
| Butyl rubber | +0.9 | +0.1 | 0 | 0 | +0.3 | −0.1 | 0 | +0.05 |
| Hypalon rubber | +1.0 | +1.6 | +0.3 | −0.2 | 0 | −0.5 | +1.3 | +0.4 |

Abbreviations:
EGDA = ethylene glycol diacrylate
NA = neopentyl glycol bis-(N-methylolacrylamide)-ether
BDGL/AS = butanediol diglycidyl ether diacrylate
HMDI/2HPA = reaction product of 1 mole of hexamethylenediisocyanate with 2 moles of hydroxypropyl acrylate.

Trimethylolpropane triacrylate shows comparable, but on average somewhat lower, values than ethylene glycol diacrylate. Comparison of EGDA with the monomers used in the printing inks according to the invention shows that as a rule EDGA swells rubber substantially more than do the other monomers. This applies particularly to Perbunan rubbers, which are frequently used in printing machines. In industrial practice, perbunan grades C and D are employed in printing machines.

EXAMPLES OF PRINTING INKS

In the examples described below, the following are used are preferred components:

1. Urethane-acrylate A, obtained by reaction of the commercially available biuret-isocyanate ® Desmodur N (manufactured by Bayer, isocyanate content approx. 16.5%, 75 percent strength solution) with an equivalent amount of hydroxypropyl acrylate. After completion of the reaction, the interfering solvent was distilled off in vacuo at 80° C.

2. Urethane-acrylate B, obtained by
   a. reaction of 1 mole of 3,3'-dimethyl-4,4'-diaminodicyclohexylmethane with 8 moles of hexamethylenediisocyanate (HMDI) until approx. 4.7 moles of HMDI have been converted and the isocyanate content is approx. from 30 to 31% and
   b. reaction with an equivalent amount of hydroxypropyl acrylate. After completion of the reaction, the mixture was briefly deodorized in vacuo. The product contains both a component (CI) and a component (CII)

3. Urethane-acrylate (C) obtained by reaction of a polyether-polyol from 1 mole of trimethylolpropane and 4 moles of propylene oxide with 3 moles of HMDI and 3 moles of HPA.

4. Urethane-acrylate (D), obtained by reaction of 1 mole of bis-(3)-methyl-4-isocyanato-cyclohexyl)-methane with 2 moles of trimethylolpropane diacrylate.

5. Urethane-acrylate (E), obtained by reaction of 1 mole of HMDI with 2 moles of HPA, briefly deodorized in vacuo.

6. Urethane-acrylate (F), obtained by reaction of 1 mole of bis-(3-methyl-4-isocyanato-cyclohexyl)-methane with 2 moles of HPA.

7. (a) Bis-(N-Methylolacrylamide)-neopentyl glycol ether, abbreviated as NA, obtained by acid etherification of 1 mole of neopentyl glycol in the presence of 3 moles of N-methylolacrylamide in toluene solution, purified by filtration, washing with water and distillation of the solvent.
   (b) Analogously obtained hydroxypivalic acid neopentyl glycol bis-(N-methylolacrylamide)-ether; HPNA.

8. A diglycidyl ether diacrylate, abbreviated as BDGL/AS, prepared by reaction of a commercially available butanediol glycidyl ether, which still contains substantial amounts of butanediol ether with only one epoxide group, epoxy value approx. 0.6–0.7 with 0.96 equivalent of acrylic acid. Deodorized in vacuo.

The substances listed, to which no claim is made herein, were each prepared according to conventional methods of reaction of isocyanates with alcohols or epoxides with carboxylic acids or conventional methods of etherification of alcohols, so that a detailed description is unnecessary.

EXAMPLE 1

A binder was prepared by homogeneously mixing 30 parts by weight of urethane-acrylate A, 44 parts by weight of urethane-acrylate E, 20 parts by weight of N-methylolacrylamide-ether HPNA, 3 parts by weight of Michler's ketone, 3 parts by weight of benzophenone and 0.1 part by weight of phenothiazine and was milled with 20% of the pigments listed below, on a triple roll mill. Irradiation experiments: the pure binder and the pigmented printing inks were printed on a proof press, in thicknesses of approx. from 1 to 1.3μ, onto Apco II/II standard art printing paper and the irradiation time required for the print to become completely non-tacky was determined immediately, by the method described in Comparative Example I. In the case of the blue pigment, an additional 3% of Michler's ketone and 3% of benzophenone were milled into the mixture. Irradiation times
   a. Unpigimented: 5 seconds
   b. Pigment = ® Permanent Yellow GR (manufactured by Hoechst AG): 7 seconds
   c. Pigment = ® Lithol Ruby 4580 (manufactured by BASF AG) : 8 seconds
   d. Pigment = ® Heliogen Blue 7080 (manufactured by BASF AG) : 13 seconds On irradiation with an Hg high pressure lamp, 80 watt/cm of reflector, for illuminating a shee width of 20–25 cm, at a distance of 10 cm, the irradiation times are found to be reduced by a factor of from 90 (unpigmented formulation) to 120 (blue formulation). This is also true in the Examples which follow:

EXAMPLE 2

Following the method described in Example 1, a binder was prepared from 30 parts by weight of urethane-acrylate B, 44 parts by weight of urethane-acrylate E, 20 parts by weight of HPNA, 3 parts by weight of Michler's ketone, 3 parts by weight of benzophenone and 0.1 part by weight of phenothiazine, pigmented and tested.
Irradiation times:
   a. Unpigmented : 4 seconds
   b. Pigment = ® Lithol Ruby 4580 : 7 seconds
   c. Pigment = ® Heliogen Blue 7080 : 11 seconds
with additional initiators as in Example 1.

EXAMPLE 3

Following the method described in Example 1, a binder was prepared from: 15 parts by weight of urethane-acrylate B, 68 parts of urethane-acrylate E, 10 parts by weight of glycidyl ether acrylate BDGL/AS, 3.5 parts by weight of Michler's ketone, 3.5 parts by weight of benzophenone and 0.15 part by weight of phenothiazine.

A printing ink is prepared by pigmenting with 18% of ® Heliogen Blue. The printing ink has a tack value of 130 at 50 m/minute and 270 at 200 m/minute, measured on a Tack-o-scope of Messrs. Rudolph Meyer, Amsterdam. The printing ink was printed on a sheet-fed letterpress printing machine fitted with a UV-curing device from Hanovia, comprising an 80 watt/cm Hg high pressure lamp. Using a sheet length of 70 cm and a printing speed of 10,000 sheets/hour, the prints obtained on coated paper (120 g/m²) were completely free from setting-off and after a brief post-curing period were also completely nonsmudging. The prints were sharp and had an attractive gloss. The same results were obtained with Lithol Yellow or Lithol Ruby as the pigment, at printing rates of 12,000 sheets/hour. No objectionable odor was found during printing. The printing ink remains stable after 3.5 months' storage.

EXAMPLE 4

Following the method described in Example 1, a binder was prepared from 10 per cent by weight of urethane-acrylate B, 68 per cent by weight of urethane-arcylate E, 5 per cent by weight of urethane-acrylate F, 10 per cent by weight of BDGL/As, 3.5 per cent by weight of Michler's ketone, 3.5 per cent by weight of benzophenone and 0.15 per cent by weight of phenothiazine.

The binder was pigmented, and printed, as described in Example 3. It gave almost identical values.

EXAMPLE 5

Following the method described in Example 1, a binder was prepared from 15 per cent by weight of urethane-acrylate B, 49 per cent by weight of urethane-acrylate E, 20 per cent by weight of NA, 10 per cent by weight of BDGL/AS, 3 per cent by weight of Michler's ketone, 3 per cent by weight of benzophenone and 0.1 per cent by weight of phenothiazine.

The binder was pigmented with 16% of Lithol Ruby 4580 and printed on a proof press.

Irradiation times under a flat-plate exposure unit; unpigmented: 5 seconds, pigmented: 8 seconds.

EXAMPLE 6

Following the method described in Example 1, a binder was prepared from 15 per cent by weight of urethane-acrylate D, 68 per cent by weight of urethane-acrylate E, 10 per cent by weight of BDGL/AS, 3.5 per cent by weight of benzophenone, 3.5 per cent by weight of Michler's ketone and 0.1 per cent by weight of phenothiazine.

The binder was pigmented with 16% of Lithol Ruby 4580 and printed on a single-color offset machine Irradiation times under a flate-plate exposure unit; unpigmented: 4 seconds, pigmented: 7 seconds.

EXAMPLE 7

Following the description of Example 1, a binder was prepared from: 30 per cent by weight of urethane-acrylate C, 53 per cent by weight of urethane-acrylate E, 10 per cent by weight of BDGL/AS, 3.5 per cent by weight of Michler's ketone, 3.5 per cent by weight of benzophenone, and 0.1 per cent by weight of phenothiazine.

The binder was pigmented with 16% of Lithol Ruby 4580 and printed on an offset printing machine from Roland, Offenbach, type RZK III. The printing machine was fitted with a UV-curing device of Hanovia, with 80 watt/cm Hg high pressure lamps and elliptical reflectors. The ink was printed at speeds of up to 12,000 sheets/hour setting-off occurring. Only 1 lamp was required for drying.

What we claim is:

1. A printing ink curable by UV radiation and comprising
   A. from 0 to 50 percent by weight of a pigment conventionally used in printing inks;
   B. from 0.5 to 15 percent by weight of a mixture of benzophenone and Michler's ketone;
   C. from 40 to 85 percent by weight of at least one polymerizable olefinically unsaturated compound which has an average molecular weight of from 250 to 4000 and which contains at least one group of the formula:

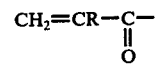

wherein R is a hydrogen atoms or a methyl group and at least one urethane group, which has been manufactured from aliphatic or cycloaliphatic diisocyanates or polyisocyanates and at least one hydroxyl-containing acrylic or methacrylic compound selected from the group consisting of ethylene glycol monoacrylate or monomethacrylate, 1,2- or 1,3-propanediol monoacrylate or monomethacrylate, 1,4-butanediol monoacrylate or monomethacrylate and 1,6-hexanediol monoacrylate or monomethacrylate and
   D. From 10 to 25 percent by weight of at least one compound which is liquid at 50° C and which is obtained by reacting a diglycidyl ether of an aliphatic diol, triol or tetrol, containing from 2 to 8 carbon atoms with acrylic acid or methacrylic acid used in an amount of at least one mole per epoxide group in the diglycidyl ether and optionally thereafter esterifying or etherifying the reaction product at the free hydroxyl group or groups thereof; the polymerizable olefinically unsaturated compound (s) (C) and the compound (s) (B) which is liquid at 50° C being such that when in admixture they form a mixture having a vapor pressure of less than 1 mm Hg at 100° C and a viscosity greater than 1 poise at 30° C and containing substantially no fatty oils of fatty acids having more than 6 carbon atoms.

2. A printing ink as claimed in claim 1 wherein constituent (B) contains approximately equal proportions of benzophenone and Michler's ketone.

3. A printing ink as claimed in claim 1 wherein the constituent (B) is present in an amount of from 2 per cent to 10 per cent by weight.

4. A printing ink as claimed in claim 1 wherein the constituent (C) comprises a polymerizable olefinically unsaturated compound which contains from 2 to 6 groups of the formula:

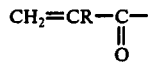

as defined in claim 1.

5. A printing ink as defined in claim 1 wherein constituent (C) comprises a polymerizable olefinically unsaturated compound which contains from 2 to 6 urethane groups.

6. A printing ink as claimed in claim 1 wherein constituent (C) comprises a polymerizable olefinically unsaturated compound having an average molecular weight of from 350 to 2000.

7. A printing ink as claimed in claim 1 wherein constituent (C) comprises a first polymerizable olefinically unsaturated compound (CI) having an average molecular weight of from 1,000 to 2,000 and a second polymerizable olefinically unsaturated compound (CII) having an average molecular weight of from 350 to 600.

8. A printing ink as claimed in claim 1 wherein the mixture of the second polymerizable olefinically unsaturated compound CII with constituent (D) has a viscosity of from 20 to 80 poise at 30° C.

9. A printing ink as claimed in claim 1 wherein constituent (D) comprises a compound having the general formula:

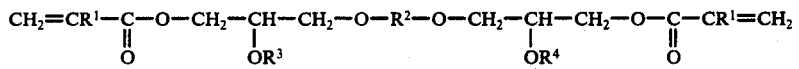

in which $R^1$ is hydrogen or methyl and $R^2$ is a hydrocarbon radical of 2 to 8 carbon atoms, and $R^3$ and $R^4$ are identical or different and are hydrogen, alkyl of 1 to 6 carbon atoms or optionally unsaturated acyl of 1 to 6 carbon atoms.

* * * * *

UNITED STATES PATENT AND TRADEMARK OFFICE
CERTIFICATE OF CORRECTION

PATENT NO. : 4,056,453
DATED : November 1, 1977
INVENTOR(S) : Barzynski et al

It is certified that error appears in the above-identified patent and that said Letters Patent are hereby corrected as shown below:

In the heading, under section [75], listing the inventors and their addresses, in line 1, delete "Bad Durkheim" and substitute --Bad Duerkheim--.

In the Abstract, line 6, delete "C. A" and substitute --C. a--.

In the claims, claim 1, column 16, line 43, delete "D. From" and substitute --D. from--; in line 53, delete "(B) which is liquid" and substitute --(D) which is liquid--.

Signed and Sealed this

Seventeenth Day of April 1979

[SEAL]

Attest:

RUTH C. MASON
Attesting Officer

DONALD W. BANNER
Commissioner of Patents and Trademarks